United States Patent
Duan et al.

(10) Patent No.: US 9,676,325 B1
(45) Date of Patent: Jun. 13, 2017

(54) METHOD, DEVICE AND SYSTEM FOR DETECTING THE PRESENCE OF AN UNATTENDED CHILD LEFT IN A VEHICLE

(71) Applicant: INTERNATIONAL BUSINESS MACHINES CORPORATION, Armonk, NY (US)

(72) Inventors: Ning Duan, Beijing (CN); Guoqiang Hu, Shanghai (CN); Jingchang Huang, Shanghai (CN); Peng Ji, Nanjing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/197,227

(22) Filed: Jun. 29, 2016

(51) Int. Cl.
  *B60Q 1/00* (2006.01)
  *B60Q 9/00* (2006.01)
  *G01V 1/00* (2006.01)

(52) U.S. Cl.
  CPC ............ *B60Q 9/00* (2013.01); *G01V 1/001* (2013.01)

(58) Field of Classification Search
  CPC .................................. B60Q 9/00; G01V 1/001
  USPC ....................................................... 340/457
  See application file for complete search history.

(56) References Cited

U.S. PATENT DOCUMENTS

| 7,710,277 | B2 | 5/2010 | Wilson | |
|---|---|---|---|---|
| 8,284,041 | B2 * | 10/2012 | Cuddihy | B60N 2/002 340/457 |
| 2008/0157985 | A1 * | 7/2008 | Wilson | B60N 2/002 340/584 |
| 2012/0154136 | A1 * | 6/2012 | Connelly, Jr. | B60Q 9/00 340/457 |

FOREIGN PATENT DOCUMENTS

CN          102259629          11/2011

OTHER PUBLICATIONS

Mohd, Hafiz Jali, Amirah Ismail, Tarmizi Ahmad Izzuddin, Mohamad Fani Sulaima, and Mohd Sulhan Mokhtar. "Feasibility study of vehicular heatstroke avoidance system for children." The International Journal of Engineering and Science 4, No. 11 (2015): 14-18.

* cited by examiner

*Primary Examiner* — Kerri McNally
(74) *Attorney, Agent, or Firm* — F. Chau & Associates, LLC (57) ABSTRACT

A method for detecting the presence of an unattended child left in a vehicle includes receiving acoustic data obtained from inside a vehicle, determining if the vehicle is running or not in response to the acoustic data, determining if all windows in the vehicle are closed when the vehicle is not running, determining if sound volume inside the vehicle exceeds a predetermined threshold when all of the windows are closed, determining if a predetermined high-frequency word is spoken inside the vehicle when all of the windows (Continued)

are closed, and outputting an alert indicating that an unattended child is left in the vehicle when the sound volume inside the vehicle exceeds the predetermined threshold and when the predetermined high-frequency word is spoken inside the vehicle.

20 Claims, 5 Drawing Sheets

METHOD, DEVICE AND SYSTEM FOR DETECTING THE PRESENCE OF AN UNATTENDED CHILD LEFT IN A VEHICLE

BACKGROUND

Every year, numerous children die from overheating or from suffering a heat stroke when forgotten inside of a locked vehicle. When the weather is hot, the temperature inside of a locked vehicle may rapidly increase and exceed the ambient temperature. In this case, a child inadvertently left inside of a locked vehicle may die from overheating or from suffering a heat stroke.

Numerous methods have been employed to determine whether children are inadvertently left in locked vehicles. For example, some methods use a weight sensor to determine whether a child is inadvertently left in a vehicle by detecting the weight of the child on a vehicle seat. However, placement of other loads on the seat, for example, books, parcels, and the like, may activate a false alarm of a child being inadvertently left in the vehicle. Other methods employ costly hardware.

SUMMARY

According to an exemplary embodiment of the present invention, a method for detecting the presence of an unattended child left in a vehicle includes receiving acoustic data obtained from inside a vehicle, determining if the vehicle is running or not in response to the acoustic data, determining if all windows in the vehicle are closed when the vehicle is not running, determining if sound volume inside the vehicle exceeds a predetermined threshold when all of the windows are closed, determining if a predetermined high-frequency word is spoken inside the vehicle when all of the windows are closed, and outputting an alert indicating that an unattended child is left in the vehicle when the sound volume inside the vehicle exceeds the predetermined threshold and when the predetermined high-frequency word is spoken inside the vehicle.

According to an exemplary embodiment of the present invention, an apparatus for detecting the presence of an unattended child left in a vehicle includes a microphone configured to obtain acoustic data inside a vehicle. A microprocessor is configured to receive the acoustic data from the microphone, to determine if the vehicle is running or not in response to the acoustic data, to determine if all windows in the vehicle are closed when the vehicle is not running, and to determine if sound volume inside the vehicle exceeds a predetermined threshold when all of the windows are closed. A speech identifier is configured to determine if a predetermined high-frequency word is spoken inside the vehicle when all of the windows are closed. A transmitter is configured to wirelessly transmit an alert to a device outside the vehicle. The alert indicates that an unattended child is left in the vehicle when the sound volume inside the vehicle exceeds the predetermined threshold and when the predetermined high-frequency word is spoken inside the vehicle.

According to an exemplary embodiment of the present invention, a method for detecting the presence of an unattended person or animal left in a vehicle includes determining that sound volume inside a vehicle exceeds a predetermined threshold when all windows in the vehicle are closed and the vehicle is not running, detecting that a predetermined high-frequency sound is made inside the vehicle when the sound volume exceeds the predetermined threshold, and outputting an alert to a source outside the vehicle when the predetermined high-frequency sound is made inside the vehicle.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In accordance with an exemplary embodiment of the present invention, a method for detecting the presence of an unattended person (e.g., a child) left in a vehicle can be used to detect whether a person is left unattended in a vehicle using sound input only. The sound input may be obtained from the interior of the vehicle. When the method detects that an unattended person is left in the vehicle, an alert may be sent to external devices located outside the vehicle or to emergency respondents.

The sound input can be used to determine whether the vehicle is running by determining whether the input sound includes a fundamental frequency. When the input sound includes a fundamental frequency, the vehicle is running. When the vehicle is running, the person, for example, the child, may be safe from overheating in the vehicle due to the presence of other people, the fact that the car is running and providing cooling, and the like.

When the input sound does not include a fundamental frequency, the vehicle is not running. In this case, the person may be in danger of, for example, overheating inside of the vehicle.

After determining that the vehicle is not running, the method may determine whether all the windows of the vehicle are closed. When at least one of the vehicle's windows is determined to be open, the person inside the vehicle may be safe from overheating. However, when the method determines that all of the vehicle's windows are closed, the person may be in danger of overheating or suffering a heat stroke.

When the method determines that all of the vehicle's windows are closed, the method then determines whether the volume of the sound input reaches or exceeds a predetermined threshold. For example, the method may detect the volume of the person's sobbing, shouting, or asking for help.

When the method determines that the volume of the sound input reaches or exceeds the predetermined threshold, the method then seeks to identify words included in the sound input. When words (e.g., "help") are identified in the sound input, then the method generates an alert and wirelessly sends the alert to external devices belonging to the person's relatives to the emergency responders. Accordingly, the relatives or emergency responders may be alerted that a person is left unattended inside of a vehicle and that the person left unattended inside of the vehicle may be in danger of overheating or suffering a heat stroke.

Figure 1:
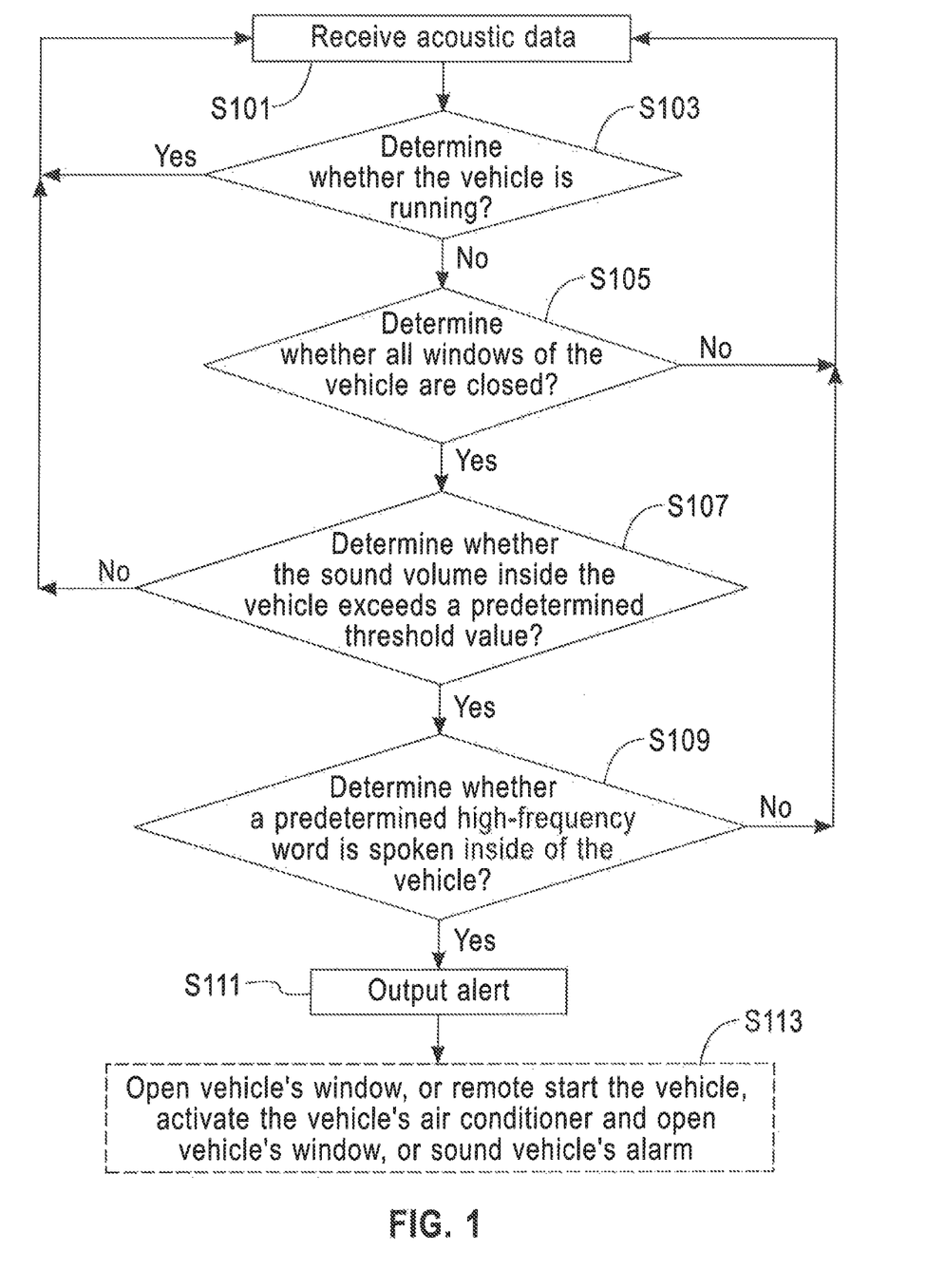
FIG. 1 is a flowchart illustrating a method for detecting the presence of an unattended child left in a vehicle, according to an exemplary embodiment of the present invention.

FIG. 1 is a flowchart illustrating a method for detecting the presence of an unattended child left in a vehicle, according to an exemplary embodiment of the present invention.

Referring to step S101, acoustic data is received from an interior of a motor vehicle. The motor vehicle may be referred to as a vehicle. The acoustic data may be continuously received, for example, in real-time. The acoustic data may be received from a sound sensor, for example, a microphone. However, acoustic data may be also received from a sound sensor other than a microphone.

In step S103, it is determined whether the vehicle is running using the acoustic data obtained from the interior of the vehicle.

Sound emitted from a vehicle that is running (e.g., the engine of the vehicle is running) may include a fundamental frequency. This sound is included in the acoustic data received in step S101. Accordingly, when the acoustic data includes a fundamental frequency, the vehicle is running, and when the acoustic data does not include a fundamental frequency, the vehicle is not running.

Step S103 may include transforming the acoustic data into a frequency domain. This may include using an algorithm, for example, Fast Fourier Transform (FFT), or the like.

Figure 2:
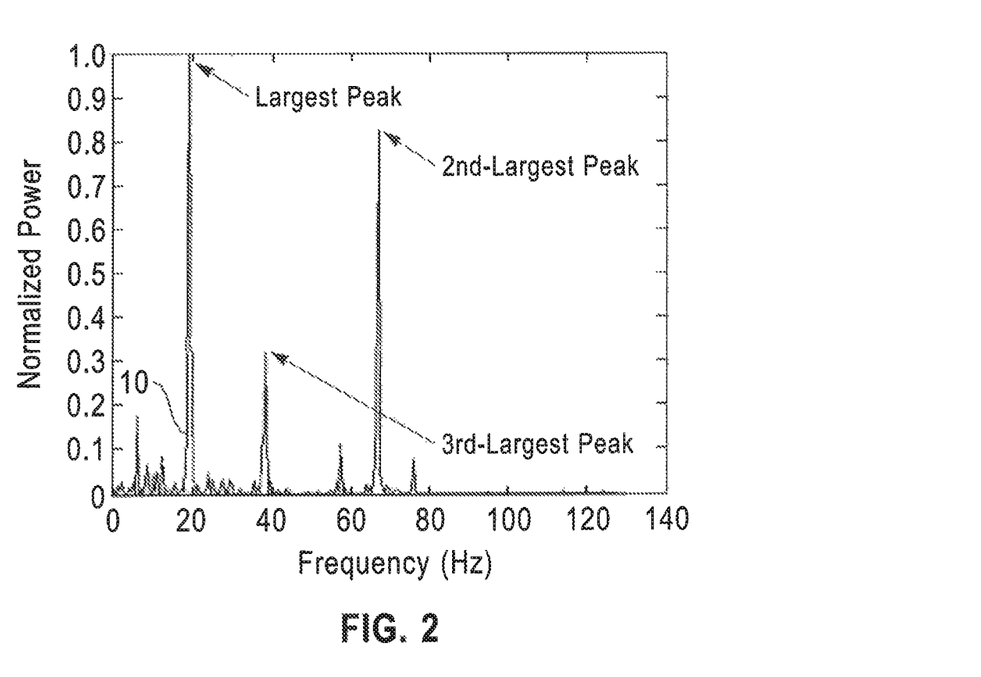
FIG. 2 is a graph illustrating acoustic data transformed into a frequency domain, according to an exemplary embodiment of the present invention.

FIG. 2 is a graph illustrating acoustic data transformed into a frequency domain, according to an exemplary embodiment of the present invention. The acoustic data 10 of FIG. 2 may have been received in step S101. As shown in FIG. 2, the acoustic data 10 is transformed into a frequency domain. The vertical axis of the graph illustrates the normalized power of the acoustic data 10, and the horizontal axis of the graph illustrates the frequency (e.g., in Hz) of the sound included in the acoustic data 10. It is understood that the acoustic data 10 shown in FIG. 2 is merely exemplary.

Step S103 may include determining peak normalized power values and their respective frequencies in the transformed frequency domain. For example, referring to FIG. 2, the largest normalized power peak occurs at 19 Hz, the second largest normalized power peak occurs at 65 Hz, and the third largest normalized power peak occurs at 39 Hz.

Step S103 may include determining if a fundamental frequency exists in the transformed frequency domain. This includes determining the frequencies that correspond to the peak normalized power values and determining whether a greatest common divisor of the frequencies can be found.

For example, referring to FIG. 2, the frequencies that correspond to the peak normalized power values of the acoustic data 10 are 19, 39, and 65 (Hz). In this case, no greatest common divisor exists between 19, 39 and 65 (Hz). Accordingly, when the frequencies are 19, 39, and 65 (Hz), a fundamental frequency is not extracted from the transformed acoustic data 20.

In another example, when the frequencies that correspond to the peak normalized power values are, for example, 17, 34, 51, and 68 (Hz), a greatest common divisor exists between 17, 34, 51, and 68 (Hz). The greatest common divisor in this case is 17. This is so because 17*2=34, 17*3=51, and 17*4=68. Accordingly, when the frequencies are 17, 34, 51, and 68 (Hz), a fundamental frequency is extracted from the transformed acoustic data 10.

It is understood that the number of peak normalized power values may vary depending on the received acoustic data 10, and that the frequency values, in Hz, corresponding to the peak normalized power values may vary depending on the received acoustic data 10. The examples provided above are merely illustrative of the present invention.

As described above, when the frequency values include 19, 39, and 65 (Hz), no fundamental frequency exists in the acoustic data 10. In this case, it is determined that the vehicle is not running. When the frequency values include 17, 34, 51, and 68 (Hz), a fundamental frequency exists in the acoustic data 10. In this case, it is determined that the vehicle is running. When it is determined that the vehicle is running, the method of FIG. 1 may loop to step S101.

In step S105, it is determined whether all of the windows of the vehicle are closed. This may be done when in step S103 it is determined that the vehicle is not running.

An action of closing a door of the vehicle may be identified in step S105. This may be done using the acoustic data 10 received from the vehicle's interior. The action of identifying the closing of a door of the vehicle may be performed, for example, by analyzing the acoustic data 10 for sound patterns that are associated with the patterns of the sound of a vehicle's door closing.

In addition, in step S105, background noise may be extracted from the acoustic data 10. The volume of the background noise may be dependent on whether the vehicle's windows are open or closed. For example, when at least one of the vehicle's windows is open, the volume of the background noise may be higher than that of when all of the vehicle's windows are closed.

In step S105, the extracted background noise may be analyzed to determine if at least one of the vehicle's windows is open. This may include analyzing the sound volume of the background noise before and after the identified door-closing action. The background noise may be extracted using, for example, a minimum statistics of background sound method. The minimum statistics of background sound method may include extracting minimum statistics project coefficients by tracking the minimum statistics of the sound included in the acoustic data 10. The tracking of the minimum statistics of the sound included in the acoustic data 10 may be implemented using the Gaussian Mixture Model.

For example, when the volume of the extracted background noise is determined to be low before the door-closing action, and the volume of the extracted background noise is determined to be low after the door-closing action, all of the vehicle's windows are determined to be closed. When the volume of the extracted background noise is determined to be low before the door-closing action, and the volume of the extracted background noise is determined to be high after the door-closing action, at least one of the vehicle's windows is determined to be open. When the volume of the extracted background noise is determined to be high before the door-closing action, and the volume of the extracted background noise is determined to be low after the door-closing action, all of the vehicle's windows are determined to be closed. In addition, when the volume of the extracted background noise is determined to be high before the door-closing action, and the volume of the extracted background noise is determined to be high after the door-closing action, at least one of the vehicle's windows is determined to be open.

When at least one of the vehicle's windows is open, the child left inside the vehicle may be safe from overheating due to the ventilation that may be provided by the open window(s). When in step S105 it is determined that at least one of the vehicle's windows is open, the method of FIG. 1 may loop to step S101.

In step S107, it is determined whether the volume of the sound included in the acoustic data 10 is equal to or greater than a predetermined threshold value, when all of the vehicle's windows are determined to be closed in step S105.

When a child is left inside of a locked car, the child may emit sounds calling for help. For example, the child may cry, shout, or speak words or phrases, for example "help", "I need help", "please help me" "mom", "dad", a combination thereof, or the like. To increase the reliability of the method of FIG. 1, and to reduce a false alarm rate (e.g., an alarm generated when a child is not present inside the vehicle), in step S107, it is determined whether a volume of sound included in the acoustic data 10 is equal to or greater than a predetermined threshold value.

The volume level of the sound included in the acoustic data 10 may be determined by measuring its energy using Decibels, the zero-crossing rate method, or the like. The zero-crossing rate method may be used to determine the volume of sound included in the acoustic data 10 by determining the rate of sign-changes along the acoustic signal included in the acoustic data 10.

Figure 3:
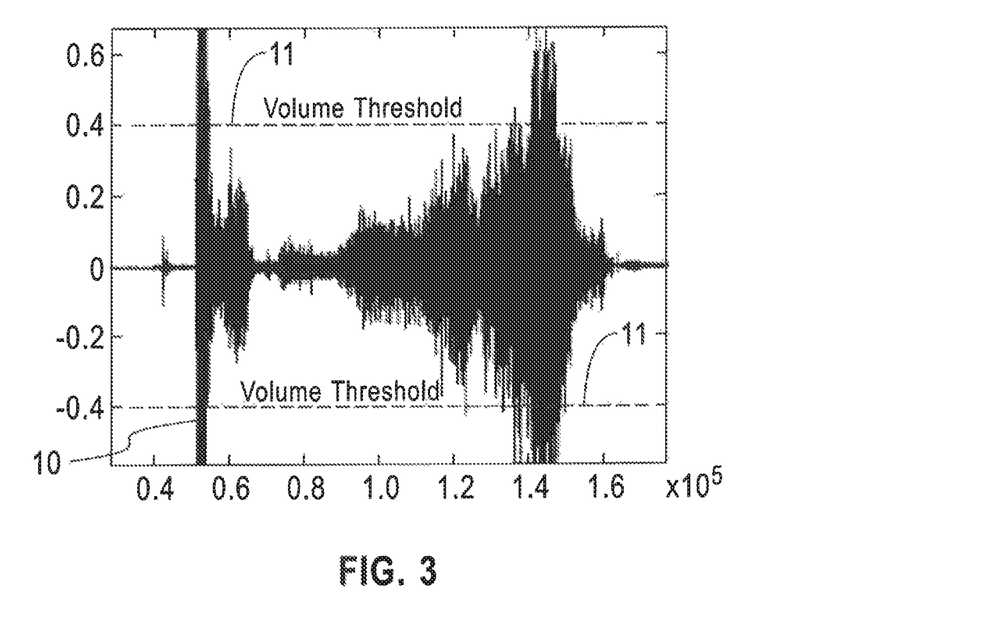
FIG. 3 is a graph illustrating the sound volume of acoustic data, according to an exemplary embodiment of the present invention.

FIG. 3 is a graph illustrating the sound volume of the acoustic data 10, according to an exemplary embodiment of the present invention. The vertical axis of the graph of FIG. 3 (e.g., ranging from −0.4 to 0.6) illustrates the sound volume of the acoustic data 10. The horizontal lines 11 illustrate the predetermined threshold volume of the acoustic data 10, according to an exemplary embodiment of the present invention. It is understood that the lines 11 illustrated in FIG. 3 are merely exemplary.

According to an exemplary embodiment of the present invention, when the sound volume level of the acoustic data 10 is not equal to or greater than the predetermined threshold, the method of FIG. 1 may loop to step S101.

In step S109, it is determined whether a predetermined high-frequency word is spoken inside of the vehicle when the volume of sound included in the acoustic data 10 is equal to or greater than the predetermined threshold value, as determined in step S107. According to an exemplary embodiment of the present invention, in step S109 it is determined that either a high-frequency word or a word that is not included in a high-frequency library 17 of FIG. 4 is spoken inside of the vehicle.

Figure 4:
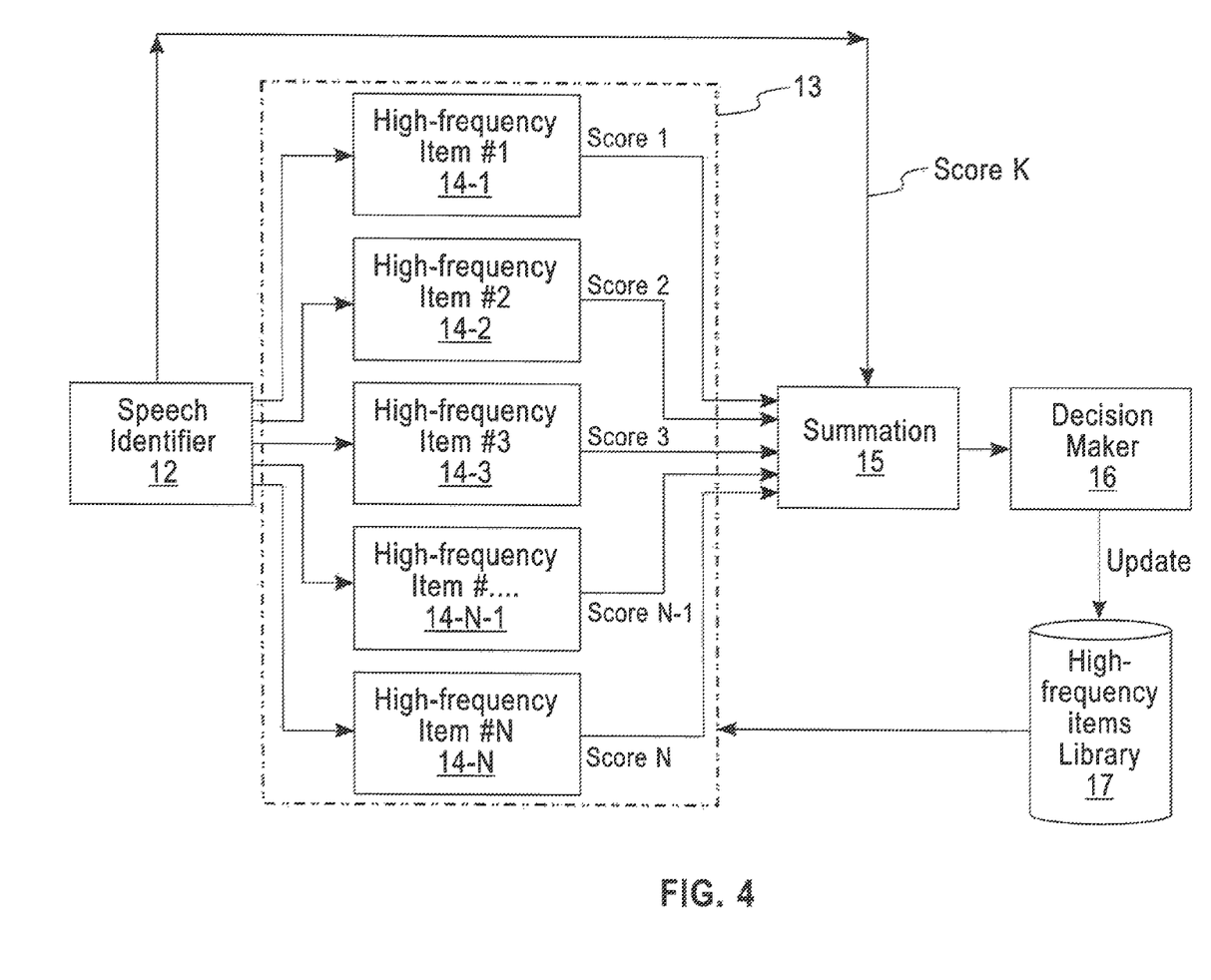
FIG. 4 is system for determining whether a predetermined high-frequency word is spoken inside of the vehicle, according to an exemplary embodiment of the present invention.

FIG. 4 is a system for determining whether a predetermined high-frequency word is spoken inside of the vehicle, according to an exemplary embodiment of the present invention. The system of FIG. 4 may be used in step S109 to determine whether a predetermined high-frequency word or a word that is not included in a high-frequency library 17 of FIG. 4 is spoken inside the vehicle. The system of FIG. 4 may be implemented by a microprocessor, or a combination of hardware circuitry such as an application-specific integrated circuit (ASIC).

Referring to FIG. 4, a speech identifier 12 may be used to identify one or more words spoken inside the vehicle by analyzing speech included in the acoustic data 10. The speech identifier 12 may include speech recognition hardware configured to recognize and translate spoken language into text recognized thereby. The speech identifier 12 may include relevant speech processing technology for language identification, for example. The speech identifier 12 may identify words spoken inside of the vehicle, for example, by identifying patterns of words in the acoustic data 10. The speech identifier 12 may be connected to a high-frequency items library 17 to determine whether the identified words are words that may be used by a person (e.g., a child) in need of help. The high-frequency items library 17 may include a list of frequently-used words that may be spoken by a person in need of help. The frequently-used words may be referred to as items of the high-frequency items library 17. The items of the high-frequency items library 17 may include words such as "I", "need", "help", "please" "mom", "dad", "hot", "breathe", "sweating", "trapped", and the like.

A group of words 13 may include items 14-1 to 14-N (e.g., N is a natural number greater than 1) of the high-frequency items library 17 identified by the speech identifier 12. The items 14-1 to 14-N may include different words spoken inside of the vehicle. For example, the item 14-1 may include the word "help", the item 14-2 may include the word "mom", and the like. In addition, the speech identifier 12 may identify words that are not included in the high-frequency items library 17.

The score of each item 14-1 to 14-N may include the number the number of times in which a word was identified. In addition, the score of each item 14-1 to 14-N may include a probability value (e.g., 65%) associated with the confidence level in the recognition of the particular word. For example, when the item 14-1 includes the word "help", the score 1 may include a first detection of the word "help" with a 70% probability value, and a second detection (e.g., repetition) of the word "help" with an 80% probability value. In addition, when the item 14-N includes the word "mom", the score N may include a first identification of the word "mom" with a 76% probability value. It is understood that the above scores are merely exemplary.

The identified words that are not included in the high-frequency items library 17 may also include a probability value associated with the confidence level of their detection. Each identified word that is not included in the high-frequency items library 17 may include a respective score K. The score K includes the probability value associated with the confidence level in the recognition of the particular identified word that is not included in the high-frequency items library 17. For example, the word "fire" may not be included in the high-frequency items library 17. The speech identifier 12 may identify the word "fire", and the speech identifier 12 may assign to the word "fire" a probability value of, for example, 80%.

The summation 15 may include a list of each of the items 14-1 to 14-N, along with their respective probability values (e.g., scores 1-N). In addition, the summation 15 includes a list of the identified words that are not included in the high-frequency items library 17 and their respective probability values (e.g., scores K). The summation 15 may be a function block of software in a microprocessor or a hardware component, for example.

The decision maker 16 determines whether an unattended child is present in the vehicle based on the scores 1-N and the score(s) K of the identified items 14-1 to 14-N and score(s) K of the identified items that are not included in the high-frequency items library 17. Like the summation 15, the decision maker 16 may be a function block of software in a microprocessor or a hardware component, for example.

According to an exemplary embodiment of the present invention, the decision maker 16 determines that an unattended child is present in the vehicle when a least one of the scores 1-N and the score(s) K of the identified items 14-1 to 14-N and the identified word that is not included in the high-frequency items library 17 meets or exceeds a preset probability value, for example, 65% or greater. The preset probability value may be varied based on user input. In other words, when an identified word, for example, the word "help" has a probability value of for example, 65% or greater, the decision maker 16 determines that a child is left unattended inside the vehicle.

In step S109 of FIG. 1, it is determined that a predetermined high-frequency word is spoken inside of the vehicle when the decision maker 16 of FIG. 4 determines that a child is left unattended inside the vehicle.

According to an exemplary embodiment of the present invention, when the identified word (e.g., fire) that is not included in the high-frequency items library 17 includes a score K of a predetermined value of, for example, 70% or higher, the identified word that is not included in the high-frequency items library 17 may be added to the high-frequency items library 17.

When the decision maker 16 determines that no words have been identified by the speech identifier 12 of FIG. 4, the method of FIG. 1 may loop to step S101, according to an exemplary embodiment of the present invention.

In step S111, an alert is output when in step S103 it is determined that the vehicle is not running, when in step S105 it is determined that all the windows of the vehicle are closed, when in step S107 it is determined that the sound volume inside the vehicle exceeds a predetermined threshold, and when in step S109 it is determined that either a high-frequency word (e.g., items 1-N) or a word that is not included in the high-frequency library 17 of FIG. 4 is spoken inside of the vehicle.

The alert may be transmitted to a device that is located outside of the vehicle. The alert may include a text message indicating that a child is left unattended inside of a locked vehicle. The alert may also be a voice message indicating that the child is left unattended inside of a locked vehicle. In addition, the alert may include, for example, an identification of the vehicle. For example, the alert may include the vehicle's license plate information, registration, make, model, color, and year of manufacturing. In addition, the alert may include global positioning system (GPS) coordinates of the vehicle. According to an exemplary embodiment of the present invention, the alert may also include a transcript the identified words spoken by the child.

The device located outside of the vehicle may be, for example, a smartphone, a mobile device, a tablet computer, a beeper, or the like. The transmission to the device located outside of the vehicle may be, for example, wireless. The wireless transmission may occur through, for example, a cellular network, a wireless local area network, WIFI, BLUETOOTH, and the like. In addition, the alert may be transmitted to emergency responders (e.g., the Police, Firefighters, and the like).

According to an exemplary embodiment of the present invention, step S113 is optional. When the alert is output in step S111, in Step S113 at least one of the vehicle's windows may be opened. In addition, in step S113, the vehicle may be remote started, the vehicle's air conditioner may be activated, and at least one of the vehicle's windows may be opened. Further, in step S113, the vehicle's alarm may be sounded.

The method of FIG. 1 is cost-efficient because it requires only acoustic data input. In addition, the method of FIG. 1 may accurately and reliably determine whether a child is left unattended in a locked vehicle because the volume of sound emitted by a child inside the vehicle must meet a predetermined threshold and the words spoken by the child inside of the vehicle may be identified as words spoken by a person.

Figure 5:
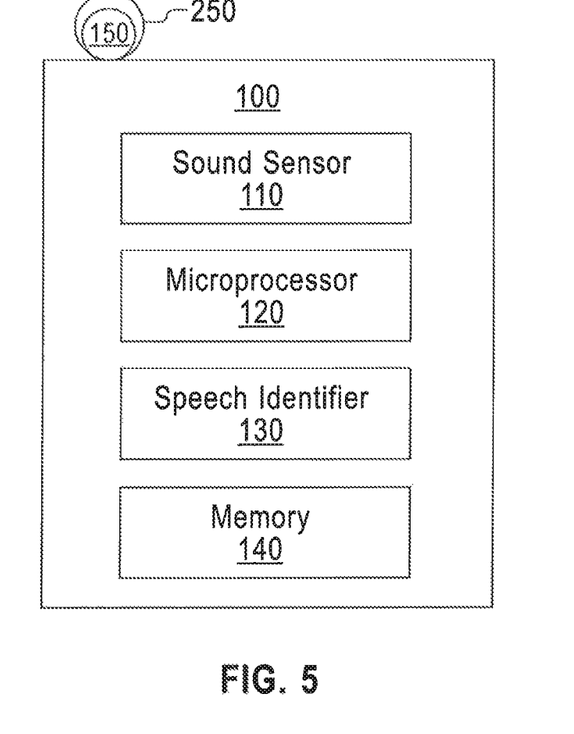
FIG. 5 is a block diagram of an apparatus for detecting the presence of an unattended child left in a vehicle, according to an exemplary embodiment of the present invention.

FIG. 5 is a block diagram of an apparatus 100 for detecting the presence of an unattended child left in a vehicle, according to an exemplary embodiment of the present invention.

The apparatus 100 may perform the method steps of the method of FIG. 1.

The apparatus 100 includes a sound sensor 110, a microprocessor 120, a speech identifier 130, a memory 140, and transceiver 250. The transceiver 250 may include a transmitter 150 to transmit signals to external devices.

The sound sensor 110 may include, for example, a microphone, a piezoelectric sound sensor, and the like. According to an exemplary embodiment of the present invention, the apparatus 100 includes one sound sensor 110. According to an exemplary embodiment of the present invention, the apparatus 100 includes a plurality of sound sensors 110.

The apparatus 100 may be disposed in a vehicle, for example, in the interior space of the vehicle. The apparatus 100 may be powered by its own batteries, by the vehicle's battery, or by another electric power supply device disposed in the vehicle.

When the apparatus 100 includes one sound sensor 100, the sound sensor 100 may be integrated in the apparatus 100. Alternatively, the sound sensor 110 may be disposed outside of the apparatus 100 and may be connected to the apparatus 100 either by wire or wirelessly.

When the apparatus 100 includes a plurality of sound sensors 110, the plurality of sound sensors 110 may be disposed in different parts of the interior of the vehicle. For example, one of the plurality of sound sensors 100 may be disposed near the back seats, or near each row of rear seats when the vehicle includes more than two rows of seats. In this case, the plurality of sound sensors 110 may be connected to the apparatus 100 either by wire or wirelessly. In addition, one of the plurality of sound sensors 100 may be integrated in the apparatus 100.

The sound sensor 110 may be used to input the acoustic data 10, received in step S101 of the method of FIG. 1, to the apparatus 100. The sound sensor 110 may input the acoustic data 10, for example, in real-time.

The microprocessor 120 may be configured to perform steps S103, S105 and S107 of the method of FIG. 1, using the acoustic data received from the sound sensor 110. In other words, the microprocessor 120 may determine whether the vehicle is running, whether all the windows of the vehicle are closed when the vehicle is not running, and whether the sound volume inside the vehicle reaches or exceeds a predetermined threshold value when the vehicle is not running and all the vehicle's windows are closed, according to the method of FIG. 1.

The speech identifier 130 may be configured to perform step S109 of the method of FIG. 1. In other words, speech identifier 130 may identify words spoken by the unattended child inside of the vehicle when the microprocessor 120 has determined that the vehicle is turned off, that all the windows of the vehicle are closed, and that the sound volume inside the vehicle reaches or exceeds a predetermined threshold value.

The high-frequency items library 17 may be stored in the memory 140. The memory 140 may be coupled to the microprocessor 120 and the speech identifier 130. The speech identifier 130 may access the high-frequency items library 17 to determine whether the identified words are high-frequency words included in the high-frequency items library 17. In addition, the speech identifier 130 may be configured to add identified words to the high-frequency items library 17 when the identified words are not included in the high-frequency items library 17.

The microprocessor 120 may be configured to determine that a child is left unattended inside of the vehicle when the microprocessor 120 has performed the steps S103, S105 and S107 of the method of FIG. 1 and has determined that the vehicle is not running, that all the windows of the vehicle are closed, that the sound volume inside the vehicle reached or exceeded a predetermined threshold value, and when the speech identifier 130 has identified that words were spoken when performing step S109 of the method of FIG. 1.

The microprocessor 120 may be configured to generate an alert when the microprocessor 120 has determined that a child is left unattended inside of the vehicle. The alert may include, for example, a text message indicating that a child is left unattended inside of a vehicle. In addition, the alert may include, for example, an identification of the vehicle. For example, the alert may include the vehicle's license plate information, registration, make, model, color, and year of manufacturing. In addition, when the apparatus 100 includes a GPS system, the alert may also include GPS coordinates of the vehicle. According to an exemplary embodiment of the present invention, the alert may also include a transcript the identified words spoken by the child.

The transmitter 150 may be configured to transmit, either wirelessly or by wire, the generated alert to one or more external devices (e.g., devices located outside of the vehicle). The one or more external devices may include a smartphone, a mobile device, a tablet computer, a beeper, and the like. The one or more devices receiving the alert may belong to, for example, the child's parents, emergency responders, or others having an interest in the child's well being.

The transmitter 150 may be included in the transceiver 250 of the apparatus 100. The transceiver 250 may communicate with external devices to send data (e.g., alerts) to the external devices using the transmitter 150, and to receive data from the external devices. The transmitter 150 may use, for example, a cellular network, a wireless local area network, BLUETOOTH, WIFI, and the like, to wirelessly transmit the alert to the one or more external devices. When the transmitter 150 uses a cellular network to transmit the alert, the transmitter 150 may be configured to use a predetermined frequency band of the cellular network.

The transceiver 250 may be used to update the high-frequency items stored in the high-frequency items library 17 by receiving a wireless signal received from an external device, the wireless signal including one or more words to be added to the high-frequency items library 17.

The apparatus 100 may also be configured to perform step S113 of the method of FIG. 1. For example, the microprocessor 120 of the apparatus 100 may be configured to open at least one of the vehicle's windows, to remote start the vehicle and to activate the vehicle's air conditioner, to sound the vehicle's alarm, to perform a combination of the above-stated actions, or the like.

The apparatus 100 may be cost-effective because it determines whether a child is left unattended in a vehicle using only a sound sensor 110. In addition, the apparatus 100 may accurately and reliably determine whether a child is left unattended in a locked vehicle because the volume of sound emitted by a child inside the vehicle must meet a predetermined threshold and the words spoken by the child inside of the vehicle may be identified as words spoken by a person.

Figure 6:
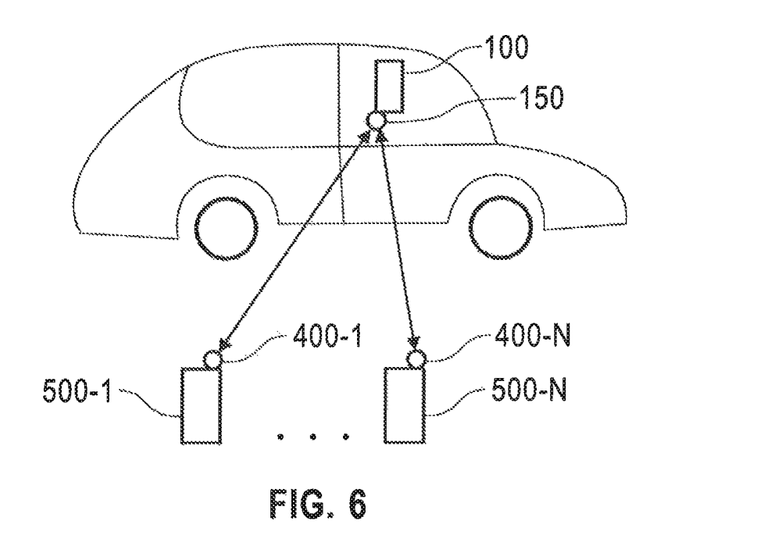
FIG. 6 illustrates a system for detecting the presence of an unattended child left in a vehicle, according to an exemplary embodiment of the present invention.

FIG. 6 illustrates a system for detecting the presence of an unattended child left in a vehicle, according to an exemplary embodiment of the present invention.

The system of FIG. 6 includes the apparatus 100 and a plurality of external devices 500-1 to 500-N (e.g., N is a positive integer greater than 1). However, a system for detecting the presence of an unattended child left in a vehicle, according to an exemplary embodiment of the present invention, may include the apparatus 100 and only the external device 500-1.

The apparatus 100 of the system of FIG. 6 may be the same as that described with reference to FIG. 5.

Each of the external devices 500-1 to 500-N may have a respective transceiver 400-1 to 400-N. The external devices 500-1 to 500-N may communicate with the apparatus 100 through the transceivers 400-1 to 400-N and the transceiver 250 of the apparatus 100.

Each of the external devices 500-1 to 500-N may be a smartphone, a mobile device, a tablet computer, a beeper, and the like. In addition, each of the external devices 500-1 to 500-N may include a display panel and a speaker.

Each of the external devices 500-1 to 500-N may communicate with the apparatus 100 via a cellular network, a wireless local area network, BLUETOOTH, WIFI, and the like, to wirelessly receive the alert generated by the apparatus 100. When the transmitter 150 uses a cellular network to transmit the alert to the external devices 500-1 to 500-N, the transmitter 150 and the transceivers 400-1 to 400-N may be configured to use a predetermined frequency band of a cellular network.

When the apparatus 100 generates an alert due to a child left unattended in a vehicle, each of the external devices 500-1 to 500-N may receive the alert and display the alert in their respective display panel, or emit a loud alarm tone through their respective speakers. The text included in the alert may indicate that a child left unattended in a vehicle. In addition, the text included in the alert may include a transcript of the words spoken by the child, GPS coordinates of the vehicle, the license plate information, registration, make, model, color, and year of manufacturing of the vehicle, and the like. In addition, the external devices 500-1 to 500-N may vibrate in response to receiving an alert indicating that a child left unattended in a vehicle.

One of the external devices 500-1 to 500-N may be configured to wirelessly update the high-frequency items library 17, stored in the memory 140 of the apparatus 100. For example, one of the external devices 500-1 to 500-N may add word entries (e.g., items) to the high-frequency items library 17.

One of the external devices 500-1 to 500-N may be in the possession of emergency respondents. Since the alert sent by the apparatus 100 to the one of the external devices 500-1 to 500-N belonging to the emergency respondents may include the fact that a child is left unattended inside of a turned-off vehicle with closed windows, the GPS coordinates and identification of the vehicle, help may be expeditiously provided to the child.

It is to be understood that although the above description has been made regarding detecting the presence of an unattended child, the present invention is not limited thereto. For example, the present invention is applicable to detecting the presence of the elderly or pets such as dogs or cats. To accomplish this, for example, the high-frequency items library 17 may include barking sounds associated with predetermined high-frequency sounds (e.g., items).

For example, when a pet such as a dog is locked in the vehicle, the pet may bark. When the dog barks, the volume of the bark may exceed the predetermined threshold described with reference to step S107 of FIG. 1.

In step S109, the speech identifier 12 may detect the bark as a sound made by an animal. The summation 15 may associate the bark with a score K of, for example, 85%. In other words, the summation 15 may indicate that there is an 85% chance that a dog barked inside of the locked vehicle. The summation 15 may include a list of a plurality of identified animal sounds, for example, barks, and their respective scores K. The decision maker 16 may determine that an unattended pet (e.g., a dog) is left unattended in the vehicle when the summation 15 includes at least one identified pet sound (e.g., bark) with a probability value of, for example, 65% or greater.

When the decision maker 16 determines that a pet is left unattended in a vehicle, an alert may be output in step S111. The alert may include information indicating that a pet is left inside of a locked vehicle. In addition, the alert may identify the type of pet, (e.g., a dog) depending on the identified sound released by the pet (e.g., a bark). The text included in the alert may indicate the type of pet identified (e.g., a dog) and the number of times the pet made sounds (e.g., barked) inside of the vehicle. In addition, the alert may include GPS coordinates of the vehicle, the license plate information, registration, make, model, color, and year of manufacturing of the vehicle, and the like.

In step S113 the vehicle may be remote started, the vehicle's air conditioner may be activated, and at least one of the vehicle's windows may be opened when an unattended pet is determined to be present inside of the vehicle. Further, in step S113, the vehicle's alarm may be sounded.

The apparatus 100 may transmit the alert to each of the external devices 500-1 to 500-N. The text of the alert, indicating that a pet is left unattended in a vehicle, in addition to the other information included in the alert as discussed above, may be displayed in the display panel of each of the external devices 500-1 to 500-N.

Figure 7:
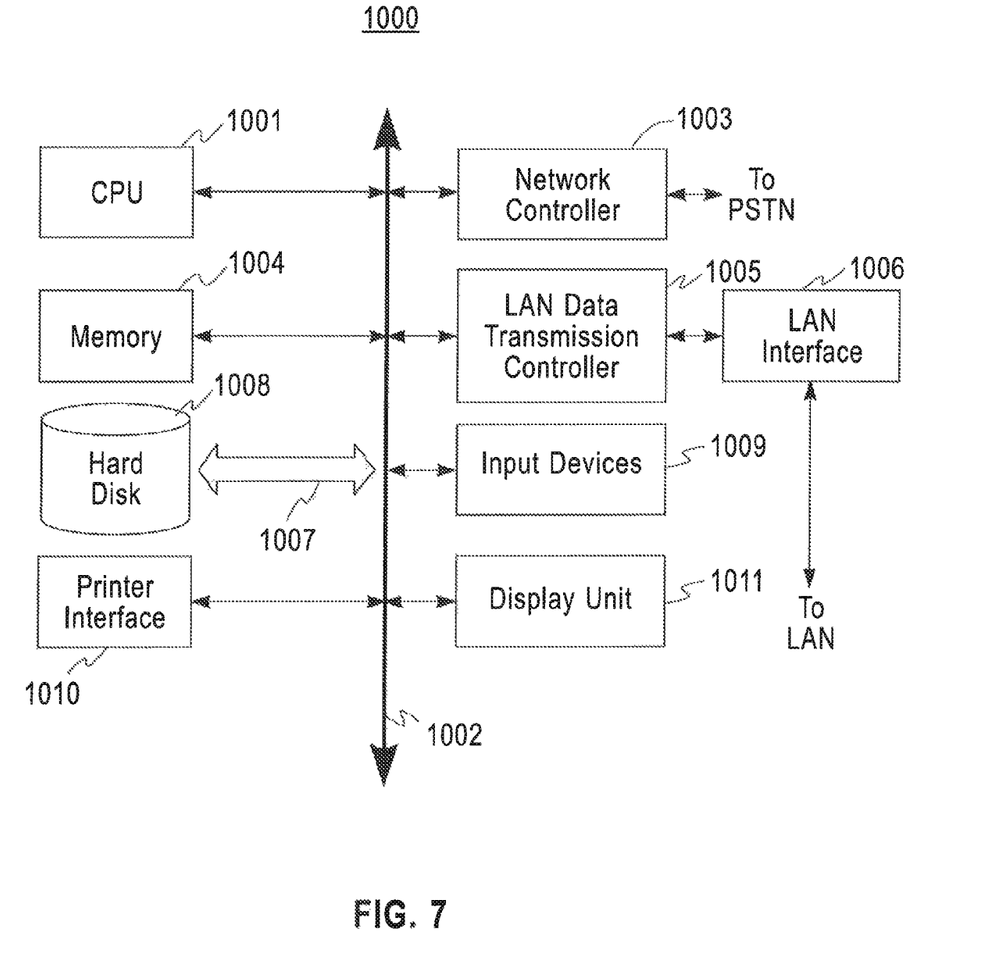
FIG. 7 shows an example of a computer system which may implement a method and system of the present invention.

FIG. 7 shows an example of a computer system which may implement a method and system of the present invention. The system and method of the present invention may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting the presence of an unattended child left in a vehicle, comprising:
   receiving acoustic data obtained from inside a vehicle;
   determining if the vehicle is running or not in response to the acoustic data;
   determining if all windows in the vehicle are closed when the vehicle is not running;
   determining if sound volume inside the vehicle exceeds a predetermined threshold when all of the windows are closed;
   determining if a predetermined high-frequency word is spoken inside the vehicle when all of the windows are closed; and
   outputting an alert indicating that an unattended child is left in the vehicle when the sound volume inside the vehicle exceeds the predetermined threshold and when the predetermined high-frequency word is spoken inside the vehicle.

2. The method of claim 1, wherein the acoustic data is obtained by a microphone.

3. The method of claim 1, wherein determining if the vehicle is running or not comprises transforming the acoustic data into a frequency domain, wherein the vehicle is running when a fundamental frequency is extracted from the transformed acoustic data and the vehicle is not running when the fundamental frequency is missing from the transformed acoustic data.

4. The method of claim 1, wherein determining if all windows in the vehicle are closed comprises:
   extracting background noise from the vehicle's environment when the vehicle is not running;
   identifying an action of closing a door of the vehicle; and
   analyzing the background noise when the door is closed to determine if a window is open.

5. The method of claim 1, wherein determining if a predetermined high-frequency word is spoken inside the vehicle comprises:
   identifying a word spoken inside the vehicle; and
   determining if the word spoken inside the vehicle is one of a plurality of high-frequency words found in a high-frequency items library.

6. The method of claim 1, wherein the sound volume inside the vehicle and the word spoken inside the vehicle are obtained by a microphone.

7. The method of claim 1, wherein the alert is wirelessly transmitted to a device outside the vehicle.

8. An apparatus for detecting the presence of an unattended child left in a vehicle, comprising:
   a microphone configured to obtain acoustic data inside a vehicle;
   a microprocessor configured to receive the acoustic data from the microphone, determine if the vehicle is running or not in response to the acoustic data, determine if all windows in the vehicle are closed when the vehicle is not running, and determine if sound volume inside the vehicle exceeds a predetermined threshold when all of the windows are closed;
a speech identifier configured to determine if a predetermined high-frequency word is spoken inside the vehicle when all of the windows are closed; and
a transmitter configured to wirelessly transmit an alert to a device outside the vehicle, wherein the alert indicates that an unattended child is left in the vehicle when the sound volume inside the vehicle exceeds the predetermined threshold and when the predetermined high-frequency word is spoken inside the vehicle.

9. The apparatus of claim 8, wherein in determining if all windows in the vehicle are closed, the microprocessor is further configured to:
extract background noise from the vehicle's environment when the vehicle is not running;
identify an action of closing a door of the vehicle; and
analyze the background noise when the door is closed to determine if a window is open.

10. The apparatus of claim 8, wherein in determining if predetermined high-frequency words are spoken inside the vehicle, the speech identifier is further configured to:
identify a word spoken inside the vehicle; and
determine if the word spoken inside the vehicle is one of a plurality of high-frequency words found in a high-frequency items library.

11. The apparatus of claim 10, wherein the high-frequency items library is stored in a memory coupled to the microprocessor.

12. The apparatus of claim 10, wherein the transmitter is included in a transceiver and the high-frequency items library is wirelessly updatable from a source outside the vehicle.

13. The apparatus of claim 8, wherein the microphone is independently powered or powered by the vehicle.

14. The apparatus of claim 8, wherein the alert is received at the device outside of the vehicle in the form of a text message.

15. A method for detecting the presence of an unattended person or animal left in a vehicle, comprising:
determining that sound volume inside a vehicle exceeds a predetermined threshold when all windows in the vehicle are closed and the vehicle is not running;
detecting that a predetermined high-frequency sound is made inside the vehicle when the sound volume exceeds the predetermined threshold; and
outputting an alert to a source outside the vehicle when the predetermined high-frequency sound is made inside the vehicle.

16. The method of claim 15, wherein the source includes a mobile device, a cellular network, or a wireless local area network.

17. The method of claim 16, wherein the alert is transmitted via Bluetooth, a cellular network frequency band, or WiFi.

18. The method of claim 15, further comprising opening at least one of the vehicle's windows in response to the detection of the predetermined high-frequency sound being made.

19. The method of claim 15, further comprising remote starting the vehicle, activating the vehicle's air conditioner and opening at least one the vehicle's windows in response to the detection of the predetermined high-frequency sound being made.

20. The method of claim 15, further comprising sounding the vehicle's alarm in response to the detection of the predetermined high-frequency sound being made.

* * * * *